United States Patent [19]
Garth et al.

[11] Patent Number: 5,256,070
[45] Date of Patent: Oct. 26, 1993

[54] DUMMY FOR PRACTICING CARDIOPULMONARY RESUSCITATION (CPR) OF A HUMAN BEING

[75] Inventors: Geoffrey C. Garth; John Hamilton, both of Long Beach; Charles A. Patterson, Westminster, all of Calif.

[73] Assignee: Asmund S. Laerdal A/S, Stavanger, Norway

[21] Appl. No.: 920,715

[22] Filed: Jul. 28, 1992

[30] Foreign Application Priority Data

Jan. 23, 1992 [DE] Fed. Rep. of Germany ....... 4201777

[51] Int. Cl.$^5$ ............................................. G09B 23/28
[52] U.S. Cl. ..................................... 434/265; 229/162; 434/267
[58] Field of Search ........................ 434/265, 267, 270; 383/907; 229/162

[56] References Cited

U.S. PATENT DOCUMENTS

| | | | |
|---|---|---|---|
| 3,049,811 | 8/1962 | Ruben | 434/265 |
| 3,994,075 | 11/1976 | Ohnke et al. | |
| 4,984,987 | 1/1991 | Brault et al. | 434/265 |

FOREIGN PATENT DOCUMENTS

1308180 12/1962 France ................... 434/265

OTHER PUBLICATIONS

Simulaids, Inc., Woodstock, N.Y., Adult CPR Training Manikin No. 2000: Instructions For Use, Care and Maintenance, 8 pp.
Life Form, Inc., Life/Form's Cparlene TM Simulators, Instruction Manual, 11 pp.
Actar 911 Squadron TM, Actar 911 Patrol TM, Actar 911 Trooper TM brochure, 8 pp. by Actar Airforce Inc., Toronto, Ontario, Can.
Ambu International A/S, Glostrip, Denmark: Description of Ambu System, 5 pp.
Medical Plastics Laboratory, Inc., Gatesville, Tex., Mar. 17, 1987, Crash Kelly CPR System, 7 pp.
Ambu International A/S, Glostrup, Denmark: Directions for use of the Ambu ® Man, The CPR simulator with the hygienic system, 23 pp.
Ambu International A/S, Glostrup, Denmark: Ambu ® Simulator II Training and Monitoring Equipment, 11 pp.

Primary Examiner—Gene Mancene
Assistant Examiner—L. Thomas
Attorney, Agent, or Firm—Kenyon & Kenyon

[57] ABSTRACT

A dummy for practicing cardiopulmonary resuscitation (CPR) of a human being comprises a simulation of the thorax, the head and the lungs, with a spring device arranged in the thorax simulation to simulate the compression resistance of the thorax. The thorax simulation is a three-dimensional structure with a thorax cavity, which is cut out of flat foldable web material, for example, cardboard, along predetermined contour lines, folded along predetermined fold lines to provide the three-dimensional structure, and joined.

36 Claims, 12 Drawing Sheets

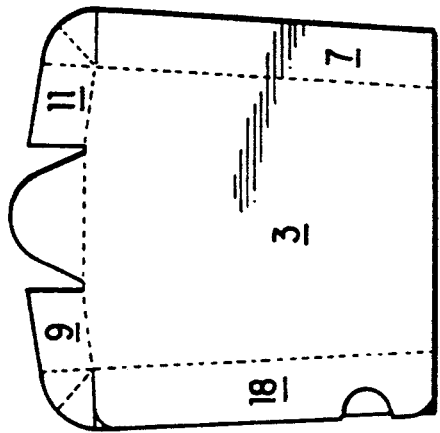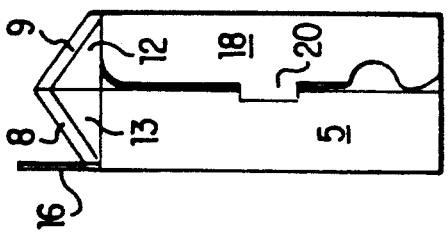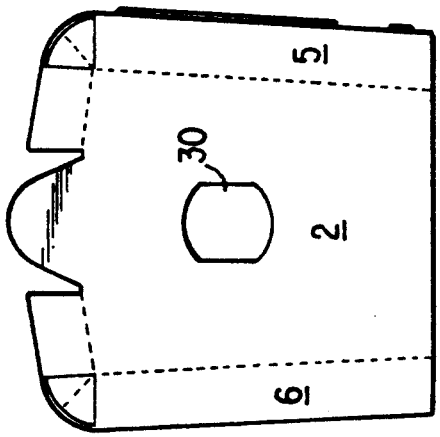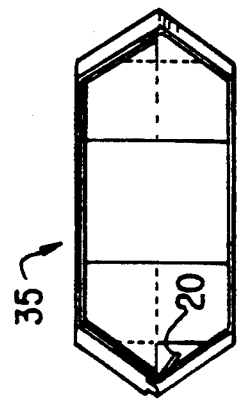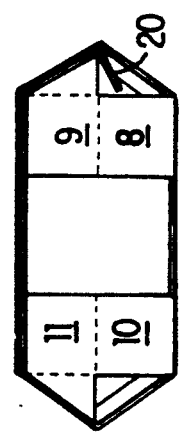

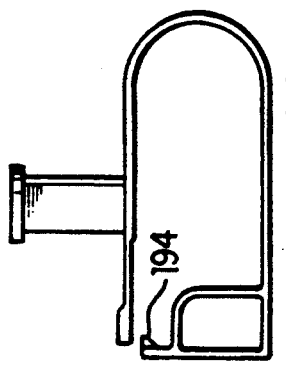 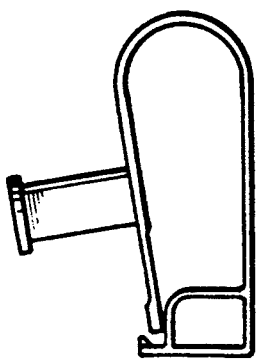 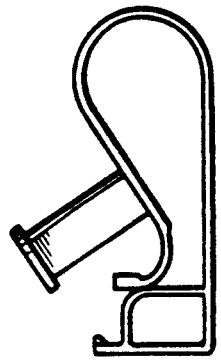
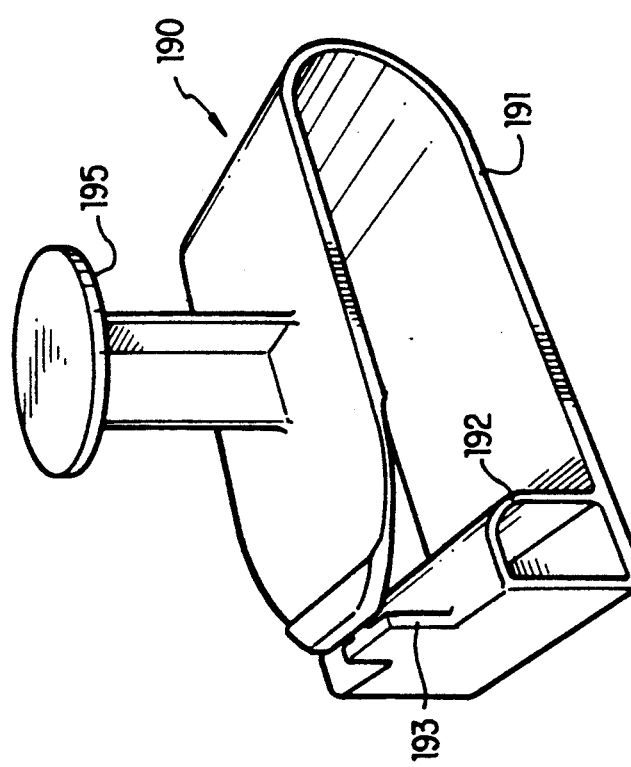

DUMMY FOR PRACTICING CARDIOPULMONARY RESUSCITATION (CPR) OF A HUMAN BEING

FIELD OF THE INVENTION

The invention relates to a dummy for practicing cardiopulmonary resuscitation (CPR) of a human being.

BACKGROUND OF THE INVENTION

Satisfactory mastery of cardiopulmonary resuscitation (CPR) presupposes adequate training and frequent practice. As CPR (i.e., heart massage and artificial respiration) cannot be practiced on a healthy human being, dummies (i.e., simulations at least of the upper body and the head of a human being) have long been known on which CPR is learned and practiced. Correct performance of CPR naturally makes a clearer and longer-lasting impression on the person learning or practicing CPR the more the performance of the training dummy approaches the behavior of a human body in terms of heart massage and artificial respiration. The known dummies of the kind set forth in this specification (e.g., 'Resusci Anne' manufactured by Laerdal) have for that purpose at least a simulation of the thorax, head and lungs. Typically, a spring means is disposed in the thorax simulation to simulate the compression resistance of the thorax and the lungs simulation is a flat bag which is connected to a mouth opening of the head simulation. Usually, the lungs bag is disposed in the thorax such that, when air is blown into the bag, the bag causes a visible lifting movement of the top of the thorax. In addition, the known dummies include means such that, when performing mouth-to-mouth artificial respiration, air is blown in against a resistance which corresponds to the respiration resistance of the human lungs, and such that artificial respiration is not possible when the head simulation occupies a position which, in the case of a human being, would result in blockage of the airways and thus ineffective artificial respiration. Furthermore, the face simulation is often of such a realistic configuration that, when carrying out mouth-to-mouth artificial respiration, the person learning or practicing the procedure is obliged to close the nose openings of the face simulation by clamping them shut, as is also required when performing artificial respiration for an accident victim.

The known dummies which provide these requirements are comparatively expensive to produce and therefore costly. Accordingly it has been the practice for CPR to be learned and practiced under the guidance of expert personnel, for example doctors, in institutes which posses a training dummy of that kind. As correct mastery of CPR presupposes constant practice, the successful learning in many cases is less than is desirable.

In order to remedy that problem, a dummy has already been developed, which involves a very low level of manufacturing expenditure and which is therefore so inexpensive that it can be acquired even by individuals for the purposes of practicing CPR at home (U.S. Pat. No. 4,984,987). That dummy has a simulation of the thorax in the form of a plastic plate which is bent rearwardly at the 'shoulders', so that is forms a front wall and a rear wall. Inserted between the front and rear walls is a spring device which can be compressed in a similar fashion to simulate a human thorax when heart massage is being performed. Fixedly inserted into the 'shoulder region' of the plate can be a hollow head simulation of plastic material, which has a mouth opening and, at its lower end, a connection for fixing a lungs bag comprising foil material.

The '987 patent dummy is admittedly very inexpensive to produce by virtue of the above-indicated construction, so that is can be acquired even in the private sector for the purposes of practicing CPR, but—at any event with the exception of heart massage—it does not fulfill any of the requirements indicated in the opening part of this specification which are absolutely essential for CPR to be satisfactorily learned. Thus, artificial respiration can be effected in the invariable attitude of the head of the dummy so that the person learning the procedure may not remember firstly to put the head in the correct attitude so that artificial respiration can have any success at all. Furthermore, the person practicing with that dummy does not have any realistic control over the correct extent of respiration because blowing up the lungs bag in effecting artificial respiration cannot result in a visible lift of the thorax simulation. In addition, the head simulation and the lungs bag do not oppose any resistance to blowing in air, so that the learner does not gain a feel for the correct respiration pressure. Further, the head simulation does not have any nostrils which can be closed by the person practicing with the dummy so that it is also not possible to practice that step which is to be effected for proper artificial respiration.

The known dummies may admittedly make it possible in many cases to remove the lungs simulation so that it can be thrown away after it has been used once, for reasons of hygiene. However removal thereof is a complicated operation because the lungs simulation must be pulled through the neck and the mouth opening, often after the thorax simulation and/or the head simulation has previously been opened. The operation of introducing the lungs simulation is a correspondingly laborious one.

SUMMARY OF THE INVENTION

One object of the present invention is that of providing a dummy of the kind which provides each of the above-indicated desirable features, but which is relatively inexpensive to produce so that it can be acquired even by private people for practicing CPR at home. The invention further seeks to provide means for simply removing the lungs simulation.

The basic concept of the invention provides that the indispensable parts of the dummy, namely the thorax and head simulation, are made up from a flat foldable web material, for example cardboard or corrugated cardboard. Corrugated cardboard which preferably has a smooth lining on both sides is particularly suitable. However plastic material in web form, for example foldable foil, is moreover also suitable. The fold lines are advantageously pre-impressed or pre-scored.

In manufacture of the three-dimensional structure, a pre-drawn flat layout of the respective portion is cut out along its contour lines and folded along predetermined fold lines to form the three-dimensional structure representing the thorax or head simulation. In order to ensure a permanent connection in the folded condition of the three-dimensional structure, the latter is joined in any fashion after the folding operation and is in that way substantially stable. The joining operation can be effected for example by clips or staples at edges which butt against each other or overlap. Preferably however there is specifically provided at least one overlap region at which a joint is effected, for example by gluing. The choice of the specified material and the mode of manufacture described provide the necessary requirement for the structural details which are necessary to fulfill at least some of the above-indicated requirements in a simple fashion. That applies not only in regard to the preferred embodiment described hereinafter, as a whole, but also in regard to portions thereof, namely the head simulation, the neck simulation and the connecting structure between the neck, and the head, which in a very simple fashion permits the trachea simulation to be clamped off in the neutral position of the head.

The essential features and advantages of the invention will be apparent from the following description of a specific embodiment with reference to the accompanying drawings, and from the subsidiary claims.

DESCRIPTION OF THE FIGURES

FIGS. 2a-2e show a rear view (a), a side view (b) from the left, a front view (c), a view from above (d) and a view from below (e), of the thorax simulation shown in FIG. 1, in the cut-out and folded condition.

FIG. 18 is a perspective view of a mechanical sound generator.

FIGS. 19a-19c show three different conditions of deformation of the sound generator, indicating the function thereof.

DETAILED DESCRIPTION OF THE PREFERRED EMBODIMENT

Figure 1:
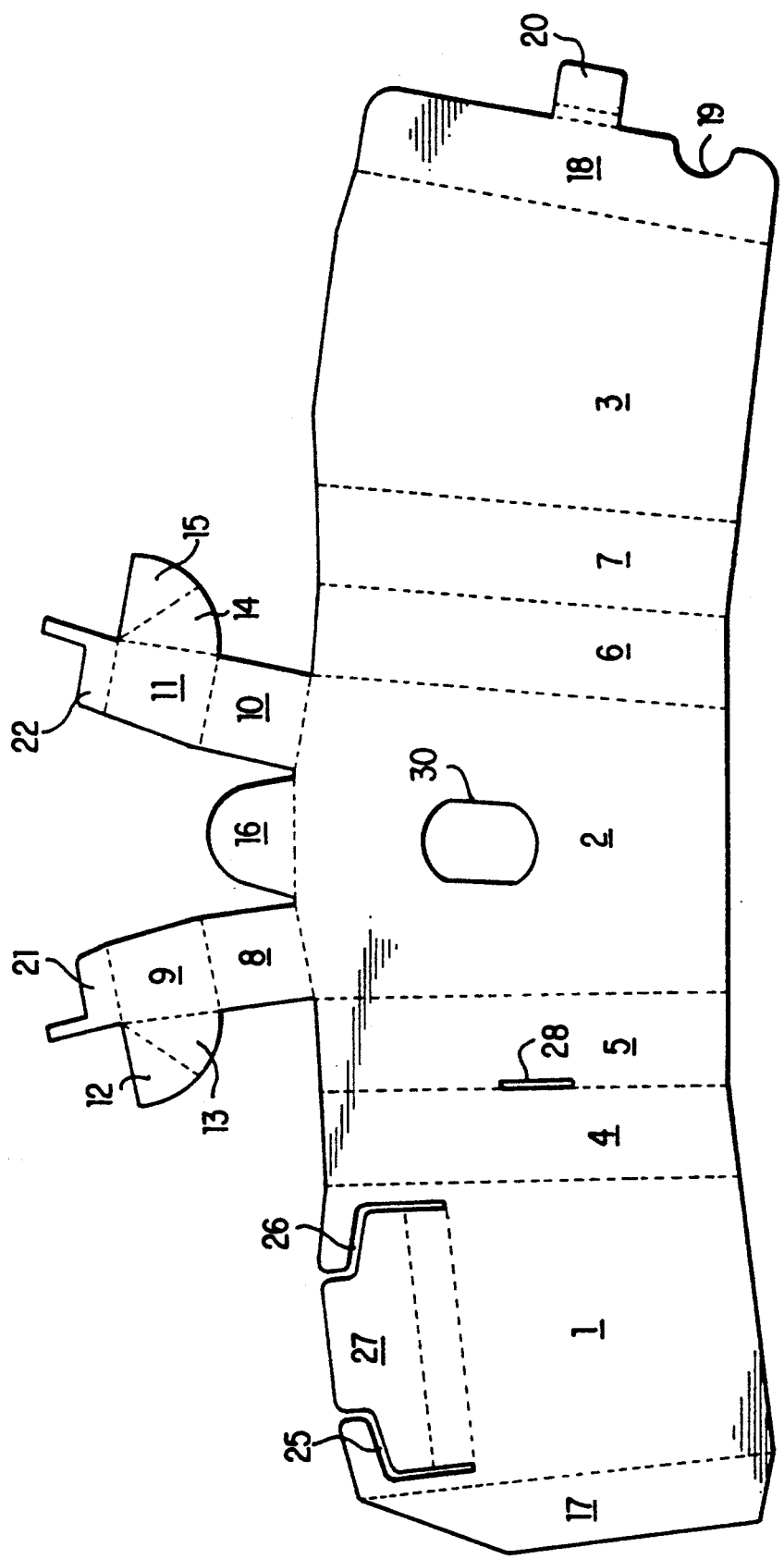
FIG. 1 is a view on a reduced scale of the flat layout of a thorax simulation according to the invention, with broken lines representing fold line.

The flat layout of the thorax simulation shown in FIG. 1 has a series of panels which are separated from each other by dotted fold lines and which, on the thorax simulation in the finally folded condition, provide the various wall portions thereof (see FIG. 2). Thus the flat layout has a panel 1 for the front wall, a panel 2 for the rear wall, a panel 3 for a cover, panels 4 and 5 of the same width for the left-hand side wall, panels 6 and 7 of the same width for the right-hand side wall, panels 8 and 9 of the same length for the left-hand shoulder portion, panels 10 and 11 of the same length for the right-hand shoulder portion, sector-shaped panels 12 and 13 of the same size as additional portions for the left-hand shoulder portion, sector-shaped panels 14 and 15 of the same size as additional portions for the right-hand shoulder portion and a neck panel 16 which extends the panel 2 for the rear wall. Adjoining the left-hand side of the panel 1 which forms the front wall is an overlap region 17 which in the folded condition is glued to the panel 7. Adjoining the right-hand side of the panel 3 which forms the cover portion is a fixing strip 18 which has a recess 19 in the vicinity of its lower end in the side edge and on which an insertion tongue 20 is directly cut. Angular overlap regions 21 and 22 extend at the upper ends of the respective panels 9 and 11 forming the shoulder portions. In the folded condition the overlap regions 21 and 22 are glued to the inside of the panel 1 forming the front wall.

Figure 13:
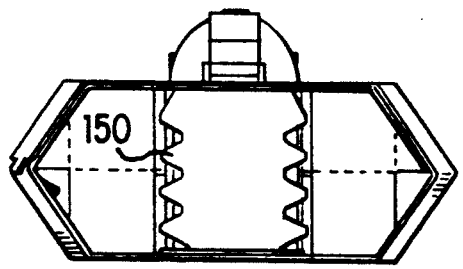
FIG. 13 is a view from below of the combination shown in FIG. 12.

A plate portion 27 is cut out in the upper region of the panel 1 by means of slits 25 and 26 which are symmetrical relative to the center line. The upper edge of the plate portion 27 is formed by the upper edge of the panel 1 while its side edges are formed by the slits 25 and 26 and it remains joined integrally to the panel 1, at its lower edge. Stamped out along the fold line which separates the panels 4 and 5 from each other is an insertion opening 28 into which the insertion tongue 20 is inserted in the folded condition of the thorax simulation (see FIG. 2e). The panel 2 has an opening 30 which in the assembled condition of the dummy serves to receive a spring device (FIG. 13).

The flat layout shown in FIG. 1 is cut out along the contour lines shown therein, with the slits 25, 26, the insertion opening 28 and the opening 30 being stamped out in the same working operation. The cut-out or stamped-out flat layout is then folded along the fold lines shown in broken line in FIG. 1 (the fold lines are desirably pre-impressed) and shaped to form the configuration shown in FIG. 2. The overlap region 17 is glued to the inside of the panel 7; the overlap regions 21 and 22 are glued to the inside of the portions of the panel 1, which lie outside the slits 25 and 26.

FIGS. 2d and 2e show that, in the folded and glued condition, the thorax simulation which is generally identified by reference number 35 is of a flat hexagonal cross-section which, as a result of the identical width of the lateral panels 4, 5 and 6, 7, makes it possible for the thorax simulation 35 to be pressed together to form a structure which lies flat, after the insertion tongue 20 has been withdrawn from the insertion opening 28. That is advantageous in regard to arranging the dummy in a space-saving fashion in transportation thereof. Moreover the width of the lateral panels is such that the head simulation described hereinafter can be stowed therein for transportation purposes and/or to provide protection from damage.

Figure 3:
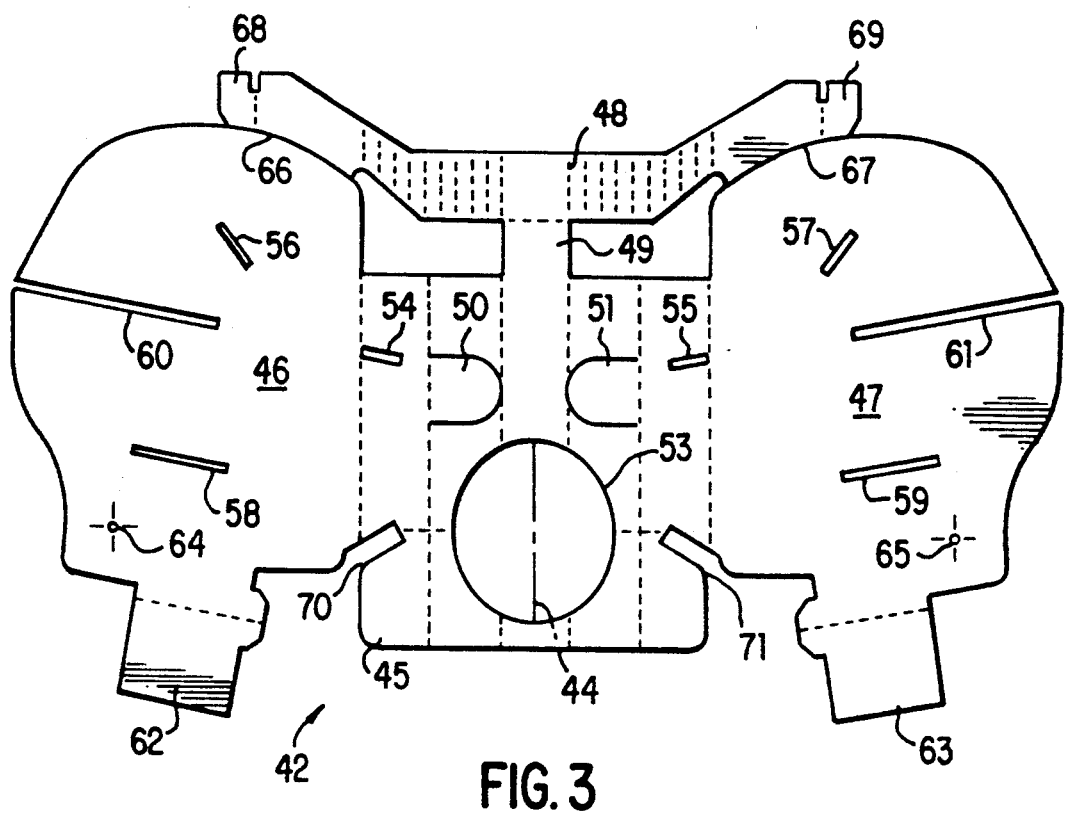
FIG. 3 is a view on a reduced scale of the flat layout of the skull portion.
Figure 4:
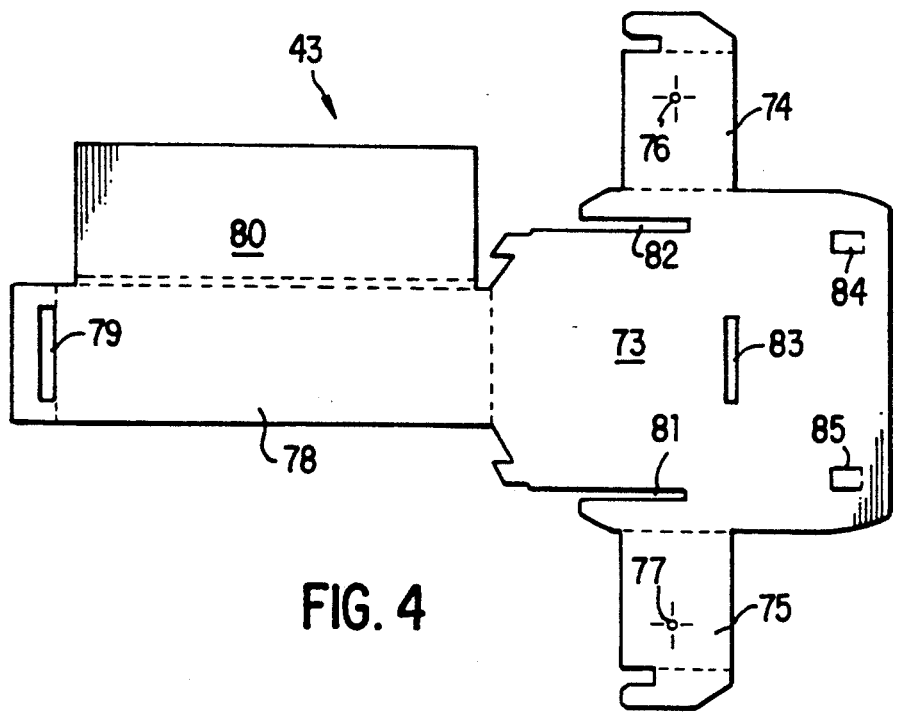
FIG. 4 is a view on a reduced scale of the flat layout of an additional skull portion.

The head simulation which is generally identified by reference numeral 40 (see FIG. 17) has, as its basic structure, a skull portion which is generally identified by reference numeral 41 (see FIGS. 5a–5e) and which in principle can be in one place, in which case it would be constructed in a similar manner to the thorax simulation 35. Here, however, it is made up from a main skull portion 42 and an additional skull portion 43. FIGS. 3 and 4 show the flat layouts of the main skull portion 42 and the additional skull portion 43 respectively.

The main skull portion 42 is symmetrical relative to a center line 44 and has a substantially square face panel 45, lateral skull surfaces 46 and 47 which respectively adjoin the left-hand and right-hand sides of the face panel 45, and a forehead panel 48 which is connected to the face panel 45 by way of a limb portion 49. Two lugs 50 and 51 are stamped in the face panel by U-shaped cuts, which serve as holding strips in the folded condition of the skull portion 41 (see FIG. 5d). The face panel 45 also has a substantially elliptical mouth opening 53 (panels which are hatched in FIGS. 3 and 4 are stamped out) and also provided therein are insertion openings 54 and 55. Further insertion openings 56, 57 and 58, 59 which are arranged symmetrically relative to the center line 44 are disposed in the lateral skull surfaces 46 and 47 respectively. The lateral skull surfaces 46, 47 also have insertion slits 60, 61 which extend inwardly from their rear side (from their outer side edge in FIG. 3) and which extend approximately to the middle of the respective panel. Provided at the lower end of the lateral skull surfaces 46, 47 are overlap extensions 62, 63 and above those, displaced somewhat rearwardly, there are holes 64, 65.

Figure 5A:
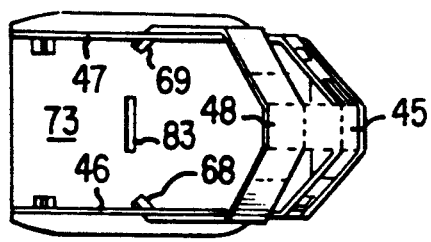
FIGS. 5a-5e are a plan view (a), a side view (b), a view from below (c), a rear view (d) and a front view (e) of the complete skull simulation consisting of the skull portions shown in FIGS. 3 and 4, in the cut-out and folded condition.
Figure 5D:
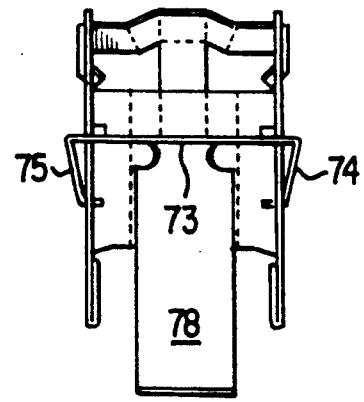
Figure 5B:
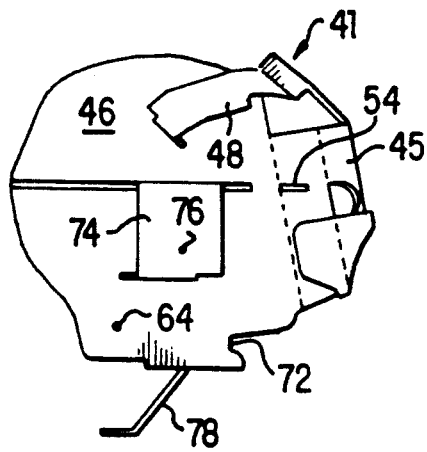
Figure 5E:
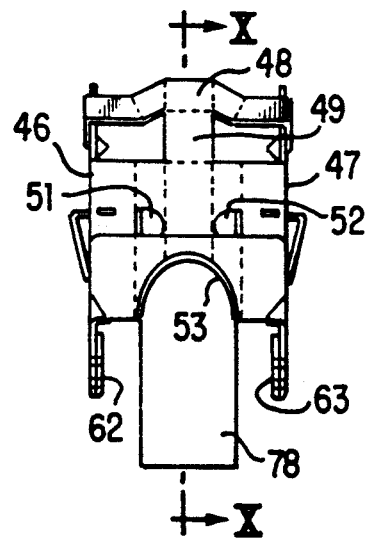
Figure 5C:
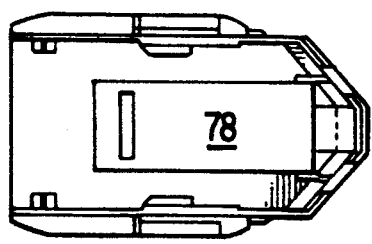

The forehead panel 48 is separated from the adjoining skull side surfaces 46, 47 by respective cut lines 66, 67 and in that region has lateral insertion strips 68, 69 which are inserted into the insertion openings 56 and 57 in the folded condition of the skull portion 42 (see FIGS. 5d and 5e).

Cut-out portions 70 and 71 are provided in the angle between the respective lateral skull panels 46 and 47 and the face panel 45.

The additional skull portion 43 includes a plate portion 73 from which insertion strips 74 and 75 project towards opposite sides. Fixing holes 76 and 77 are provided in the strips 74 and 75. Projecting from the lower edge (at the left in FIG. 4) of the plate portion 73 is a strip portion 78 which has an insertion opening 79 in the vicinity of its lower end and which is laterally adjoined by a reinforcing strip portion 80 which is folded back on to the rear side of the strip portion 48 and glued thereto. The plate portion 73 has insertion slits 81 and 82 which are arranged symmetrically relative to its longitudinal center, and a centrally disposed insertion opening 83. Two lugs 84 and 85 are formed by U-shaped stamped cuts at the rear edge (at the right in FIG. 4) of the plate portion 73.

In FIGS. 3 and 4, fold lines are again indicated by dotted or dashed lines, which make it possible for the panels which are defined in that way to be folded or bent relative to each other so as to produce a three-dimensional structure.

In order to make the skull portion 41 shown in FIGS. 5a–5d, from the flat layouts illustrated in FIGS. 3 and 4, the flat layouts are cut or stamped out, with the various insertion openings and the mouth opening 53 preferably being stamped out at the same time, and folded along the specified fold lines. The reinforcing strip portion 80 is laid over onto the strip portion 78 and glued thereto so that thereafter the strip portion 78 is of double the thickness of material. The lateral skull surfaces 46 and 47 are bent rearwardly substantially at a right angle about the fold lines which adjoin them towards the face panel 45, so that the lateral skull surfaces 46 and 47 come to lie parallel to each other. The face panel 45 itself is only slightly bent about the fold lines disposed therein, so that the result is a forwardly rounded shape (see FIGS. 5a and 5c). In that position the plate portion 73 is inserted into the slits 60 and 61 from the rear, with the slits 81 and 82 of the plate portion 73 facing forwardly, until the short insertion strips disposed at the front edge of the plate portion 73 pass through the insertion openings 54, 55 of the face panel 45, and are folded over on the outside thereof. Thereupon the lateral insertion strips 74, 75 of the plate portion 73, which project out of the slits 60, 61 in the lateral skull surfaces 46, 47, are folded downwardly and inserted with their notched and portions into the lateral insertion openings 58, 59 in the lateral skull surfaces 46, 47 (see FIGS. 5d and 5d).

The lower part of the face panel 45 is folded over outwardly and upwardly about the fold line which connects the openings 70 and 71 together and glued to the corresponding part of the face panel 45, thus giving the semi-elliptical mouth opening 53 shown in FIG. 5e. The extension portions 62 and 63 at the lower edges of the lateral skull surfaces 46 and 47 are folded over inwardly about the fold lines shown thereat, and glued to the inward sides of those skull surfaces so that gives a stiffening effect for the mounting openings 72, as shown in FIG. 5b. It will be appreciated that, before the plate portion 73 is inserted into the slits 60, 61, the strip portion 78 has been bent over downwardly about the fold line shown thereat, so that it projects downwardly in the manner shown in FIG. 5b.

The lateral insertion strips 68, 69 of the forehead panel 48 can now be inserted into the associated insertion openings 56, 57 in the lateral skull surfaces 46, 47 (see FIG. 5d) so that the forehead panel 48 also assumes a forwardly curved configuration, on the basis of the numerous fold lines which have been pre-impressed therein.

Figure 6:
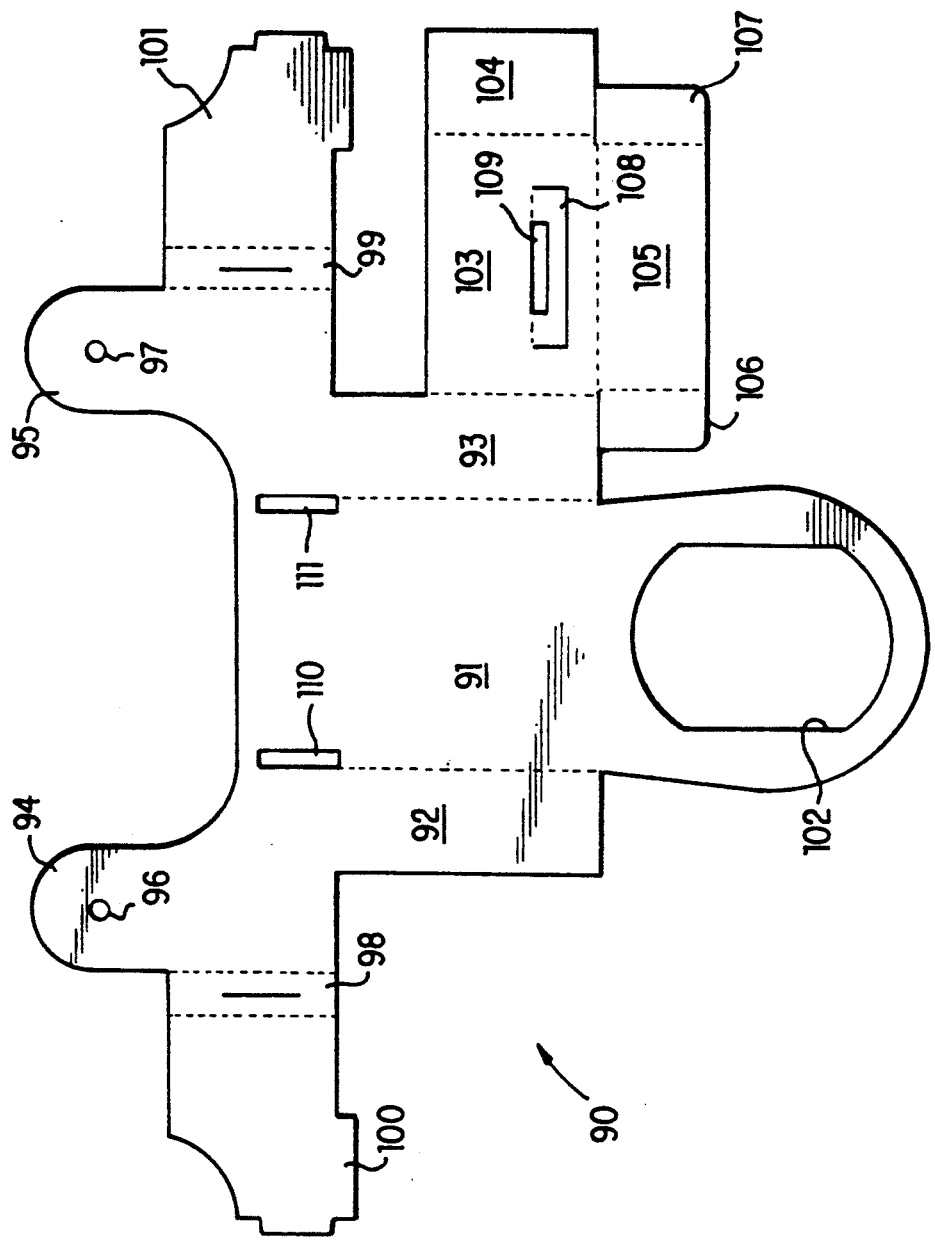
FIG. 6 is a view on a reduced scale of the flat layout of a neck portion.

The flat layout of the neck portion shown in FIG. 6, which is generally identified by reference numeral 90, comprises a panel 91 forming a rear wall, a side panel 92 adjoining same at the left, and a side panel 93 adjoining same at the right. Extending upwardly from each of the two side panels 92 and 93 is a respective support strip 94 and 95 having holes 96 and 97. Laterally adjoining each of the support strips 94 and 95 is a respective narrow front wall 98 and 99 respectively, and adjoining those are respective stiffening strips 100 and 101.

Approximately the lower half of the central panel 91 extends beyond the side panels 92, 93 and includes an opening 102 which in shape and size precisely corresponds to the opening 30 in the rear wall 2 of the thorax simulation 35. Laterally adjoining the side panel 93 in the lower part thereof is a panel 103 which provides the front wall and which is extended towards the side to provide a lateral stiffening strip 104 and downwardly to provide a bottom wall 105 which in turn has two lateral stiffening strips 106 and 107 at the left and the right. As can be seen from FIG. 6, the stiffening strips 106 and 107 are cut in as far as the lateral fold lines of the front wall 103. A lug 108 is cut out by means of a U-shaped stamped cut in the front wall 103 and contains as insertion opening 109. Insertion openings 110 and 111 are also stamped out at the lateral fold lines of the central panel 91, in the vicinity of the upper end thereof.

FIG. 6 also shows in dotted form the fold lines about which the various panels are folded or bent relative to each other.

Figure 7A:
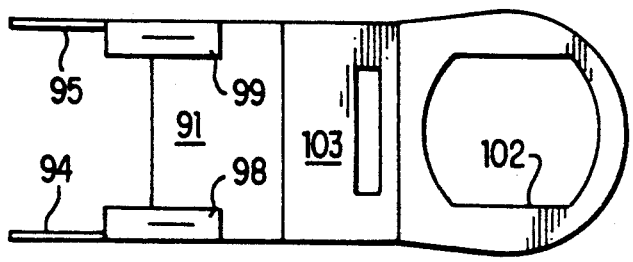
FIGS. 7a-7e show a front view (a), a side view (b), a rear view (c), a view from below (d) and a plan view (e) of the neck portion shown in FIG. 6 in the cut-out and folded condition.
Figure 7D:
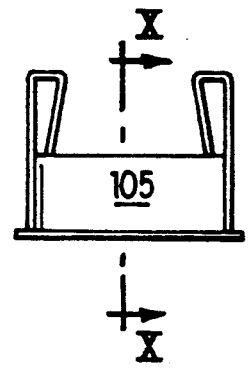
Figure 7B:
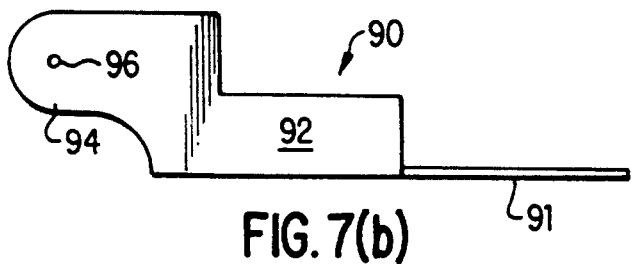
Figure 7C:
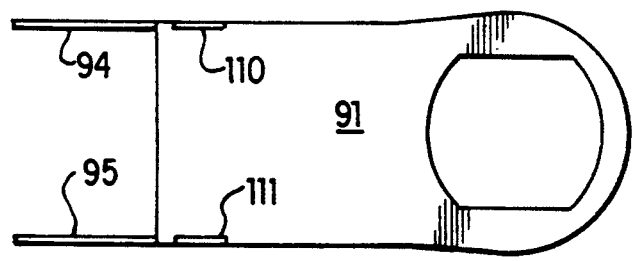
Figure 7E:
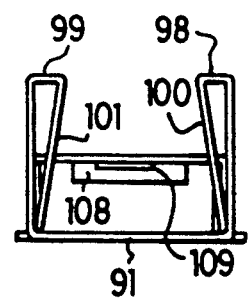

When producing the neck portion 90, the side panels 92 and 93 are bent over forwardly at a right angle so that the support strips 94 and 95 come to lie parallel to each other and the holes or bore 96 or 97 provided therein are aligned with each other along a line which is parallel to the rear wall 91. The panels laterally adjoining the support strips 94 and 95 are each also folded over through about 90° at the associated fold line, thus giving the lateral stiffening walls which can be seen from FIG. 7e. The front wall 103 is bent over at a right angle about the fold line adjoining the lateral panel 93 so that it comes to lie parallel to the rear wall 91; the stiffening strips 106 and 107 of the bottom wall 105 which is also bent over forwardly at a right angle, and to the inside surface of the left-hand side panel 92. The lug 108 is bent over at a right angle into the interior of the box-like configuration formed in that way (see FIG. 7e). After assembly the neck portion has a generally U-shaped cross-section (as shown in FIGS. 7d and 7e).

Figure 8:
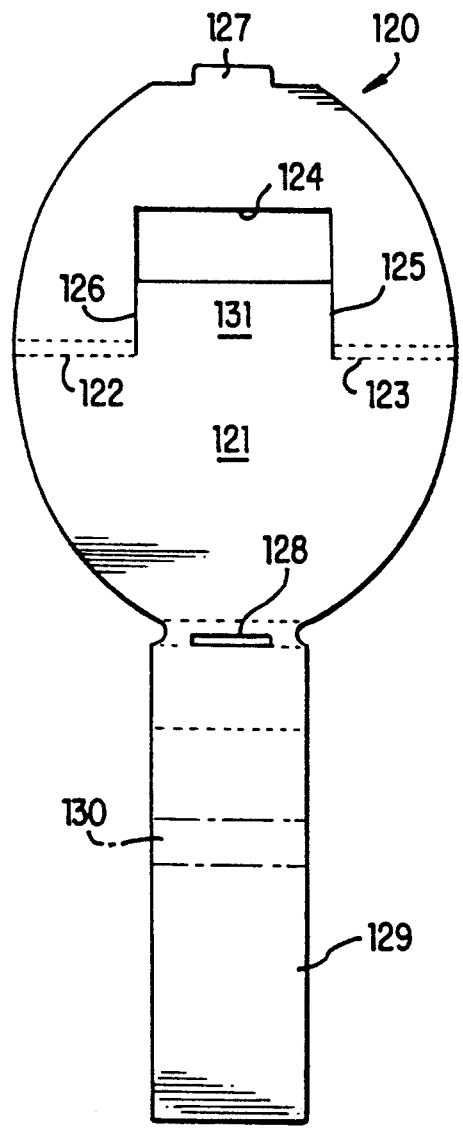
FIG. 8 is a view on a reduced scale of the flat layout of a jaw portion.

The jaw simulation which is generally identified by reference numeral 120 involves the flat layout shown in FIG. 8. It has a chin panel 121 which is approximately elliptical and which can be folded over on to itself about central fold lines 122 and 123, and glued at that location. Provided in the rear part (upwardly in FIG. 8) of the chin panel 121 is a rectangular stamped-out portion 124, the lateral edges of which are extended by cuts 125, 126 as far as the fold lines 123, and 122 respectively. Carried at the upper end is an insertion strip 127 which, after the one panel half 121 has been folded back, can be inserted into an insertion opening 128. A strip 129 which is disposed at the front edge (downwardly in FIG. 8) of the chin panel 121 has a plurality of fold lines so that it can be folded in a zig-zag configuration in the manner shown in FIG. 9b, and can be folded back with a gluing region 130 on to the chin panel 121.

Figure 9D:
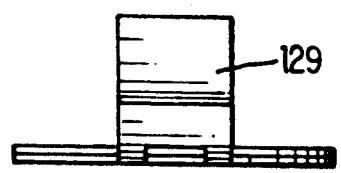
FIGS. 9a-9e show a plan view (a), a side vies (b), a view from below (c), a front view (d) and a rear view (e) of the jaw portion shown in FIG. 8 in the cut-out and folded condition.
Figure 9E:
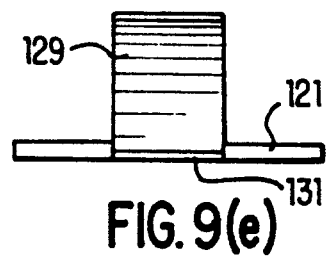
Figure 9A:
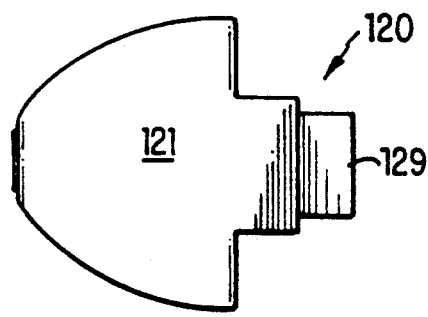
Figure 9B:
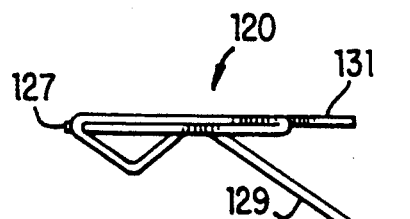
Figure 9C:
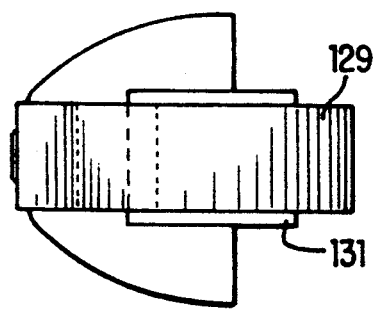

By virtue of the chin panel 121 being folded back on to itself about the fold lines 122 and 123, whereupon the panel halves are glued to each other in areal contact, the portion 131 which is formed between the cuts 126 and 127 remains as a rearwardly directed projection (see FIG. 9b). The rounded configuration which occurs at the doubled fold lines 122 and 123 forms a respective support surface for mounting in the mounting openings 72 in the skull portion 41.

Figure 10:
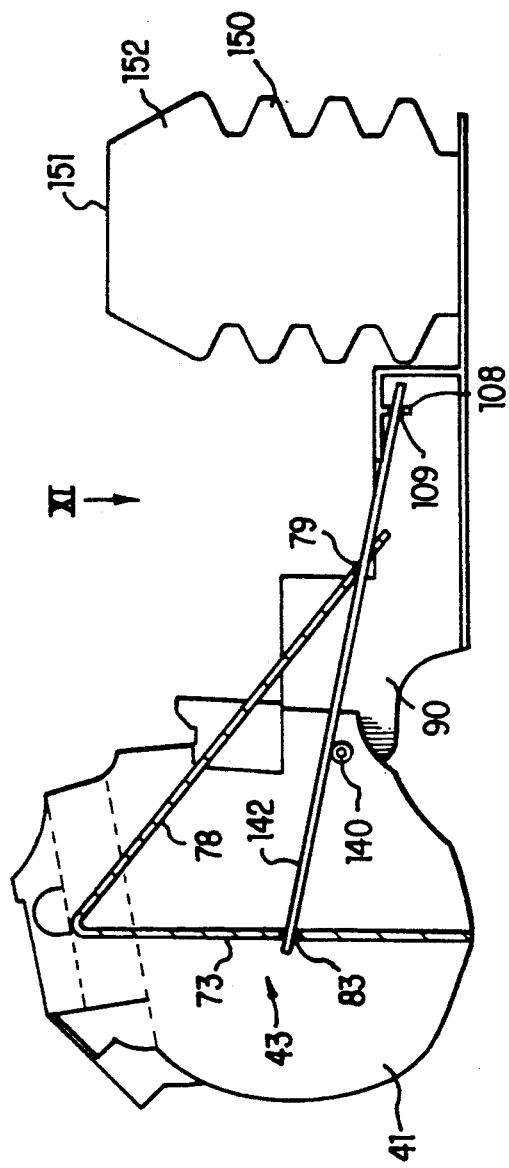
FIG. 10 is a sectional side view of the skull portion/neck portion combination, in section taken along line X—X in FIG. 5a and line X—X in FIG. 7d, with parts being omitted for the sake of clarity of the drawing.
Figure 11:
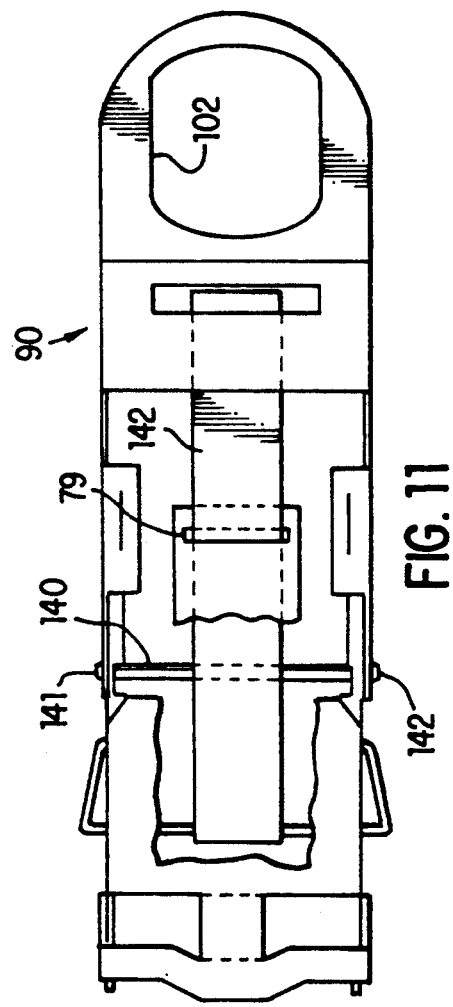
FIG. 11 is a partly broken-away view in the direction of the arrow XI in FIG. 10.

FIGS. 10 and 11 show how the skull portion 41 is connected to the neck portion 90, namely by a bar or tube 140 of relatively hard plastic material which passes through the holes 64, 65 of the skull portion 41 and the holes 96, 97 in the support strips 94, 95 of the neck portion 90, and is fixed at its end by rivets 141 so that the skull portion 41 is pivotable about the axis formed in that way, relative to the neck portion 90. Arranged in the interior of the skull portion 41 is a flexible spring bar 142 comprising a flat springy plastic material which with its upper end portion (at the left in FIG. 10) passes through the opening 83 in the plate portion 73 of the additional skull portion 43, extends in front of (in FIG. 10, above) the tube 140 forming the pivot axis, passes from the rear through the opening 79 at the lower end of the strip portion 78 and projects with its lower end portion (at the right in FIG. 10) through the opening 109 in the lug 108. The flexible spring bar 142 is substantially straight in the unstressed condition and bears lightly against the tube 140.

FIG. 10 shows a spring element 150 in the form of a cylindrical bellows of plastic material, whose rearward end (the lower end in FIG. 10) is substantially precisely adapted in terms of its shape and size to the opening 102 in the neck portion 90 and can be inserted therein with a close fit. For assembly of the skull portion 41/neck portion 90 combination, in the form shown in FIG. 11, with the thorax simulation 35, the lower end of the neck portion 90 is inserted between the shoulder portion of the thorax simulation into the interior thereof until the opening 102 of the neck portion 90 coincides with the opening 30 in the rear wall 2 of the thorax simulation. In that condition, the spring element 150 is inserted from below into the interior of the thorax simulation, with a slight expansion of the front wall 1 and the rear wall 2 relative to each other, and pressed with its lower end into the openings 102 and 30. The close press fit with which the lower end of the spring element 150 fits into those openings is sufficient for the neck portion 90 to be firmly connected to the thorax simulation 35, and also to ensure that the spring element 150 is held in a stable fashion relative to pressure forces which act from above and which have a slight lateral component. The lower end of the spring element 150 is stepped in a manner which is not shown, so that the resulting shoulder presses against the top side of the edge region around the opening 102 and thus firmly fixes the neck portion 90 to the rear wall 2. The upper surface 151 of the spring element 150 which, to prevent damage to the inside of the front wall 1, can be formed by a conical attachment portion 152 comprising a softer material which is different from the resilient material of the spring element 150 only ears against the inward side of the front wall 1. As is known in relevant fashion, the spring element 150 is so designed in terms of its spring stiffness that it provides the thorax simulation 35 with characteristic compressibility, corresponding to the yielding nature of the human thorax. At the same time, in accordance with the invention, the spring element 150 acts as a connecting element for connecting the thorax simulation 35 to the neck portion 40.

Figure 14:
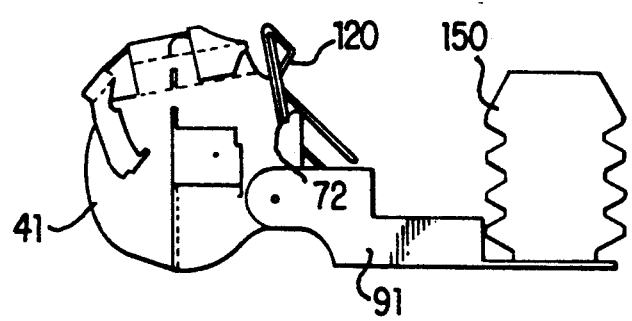
FIG. 14 is a side view of the skull portion/neck portion combination with the jaw portion inserted.

FIG. 14 shows the combination of skull portion 41 and neck portion 90 completed by the jaw simulation 120 and the spring element 150, with the jaw simulation 120 being only loosely inserted into the mounting openings 72.

Figure 16:
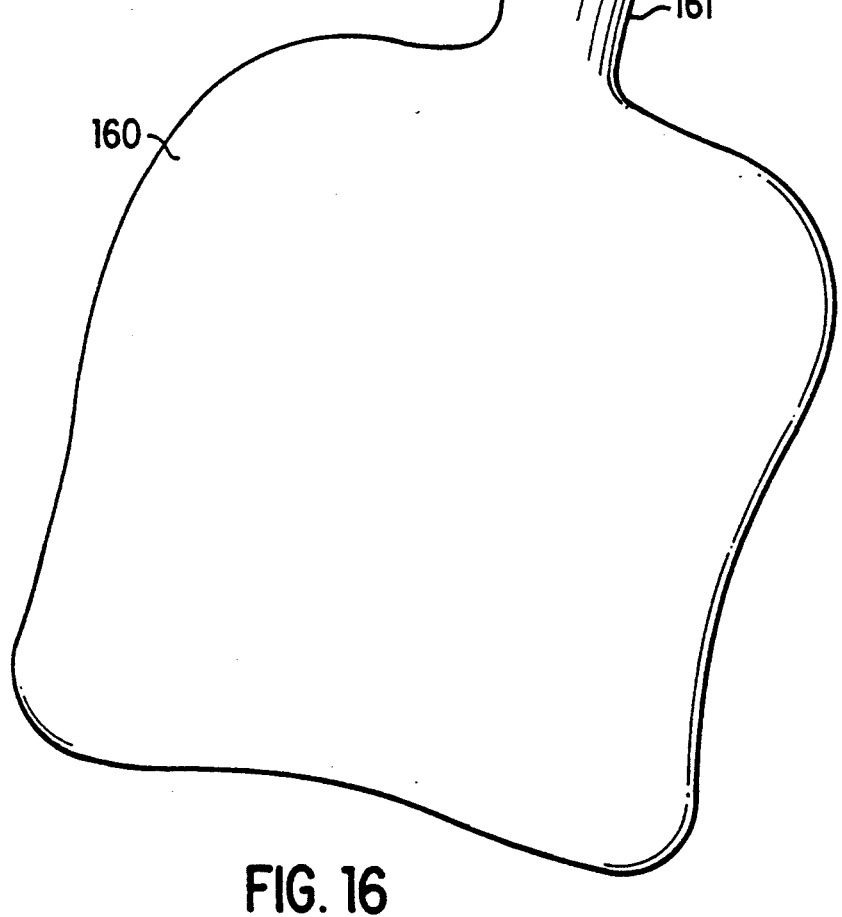
FIG. 16 shows a unit comprising the exhalation valve shown in FIG. 15, a trachea simulation and a lungs bag.

The dummy according to the invention is completed by the trachea/lungs simulation shown in FIG. 16. The lungs are simulated by a flat bag 160 which is integrally adjoined by a trachea simulation 161, the length of which is shown in shortened form in FIG. 16. In actual fact the trachea simulation is of such a length that it permits a communication between the lungs bag 160 which lies against the top side of the front wall 1 and the interior of the head simulation 40 (see FIG. 17). Disposed at the upper end of the trachea simulation 161 is a non-return exhalation valve 162 form a unit which, as will be described in greater detail hereinafter, is easily interchangeably arranged in the dummy according to the invention.

The non-return exhalation valve 162 comprises a connecting portion 164 having a holding rim 163, and a lower connecting portion 165. The connecting portion 164 and the connecting portion 165 are formed in the illustrated embodiment by two separate components, but they may also be made in one piece. Together they form a valve housing 166.

Figure 15:
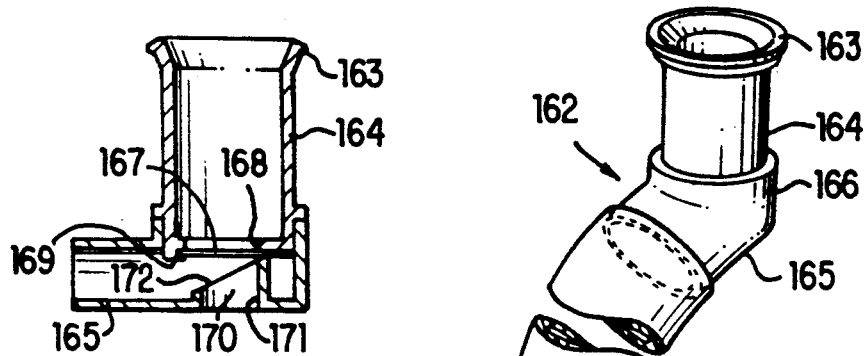
FIG. 15 is a view in axial section through a non-return exhalation valve.

At its lower end the connecting portion 164 has a blowing-in opening 168 which forms a first valve seat 169 and is covered by a valve diaphragm 167. The valve diaphragm 167 is fixed, for example glued, to the underside of the connecting portion 164, by means of the edge portion of the valve diaphragm which is at the right in FIG. 15. The connecting portion 165 which is of a substantially flat-elliptical cross-section has at its underside a blowing-out opening 170 which is surrounded by an inclinedly cut-away tubular projection portion 171. The projection portion 171 extends inclinedly towards the outlet opening of the connecting portion 165 and forms a second valve seat 172, the sealing plane of which extends at an acute angle relative to the sealing plane of the first valve seat 169.

By virtue of being of the above-described configuration, the non-return exhalation valve 162 can provide a non-return function, insofar as, when air is blown into the connecting portion 164, the valve diaphragm 167 is lifted off the first valve seat 169 so that air passes into the connecting portion 165 and from there by way of the trachea simulation 161 into the lungs bag 160. During that period of time the valves diaphragm 167 bears sealingly against the second valve seat 172 so that no air can escape through the blowing-out opening 170. When the blowing-in operation is concluded, the valve diaphragm 167 again automatically bears sealingly against the first valve seat 169 and again opens the second valve seat 172. Air returning from the inflated lungs bag 160 cannot now pass into the connecting portion 164 but passes into the open through the blowing-out opening 170.

That very simple design configuration of the valve 162 makes manufacture thereof so inexpensive that if necessary the unit 160, 161 and 162 can be in the form of a one-trip or disposable article which is thrown away after it has been used once.

Figure 17:
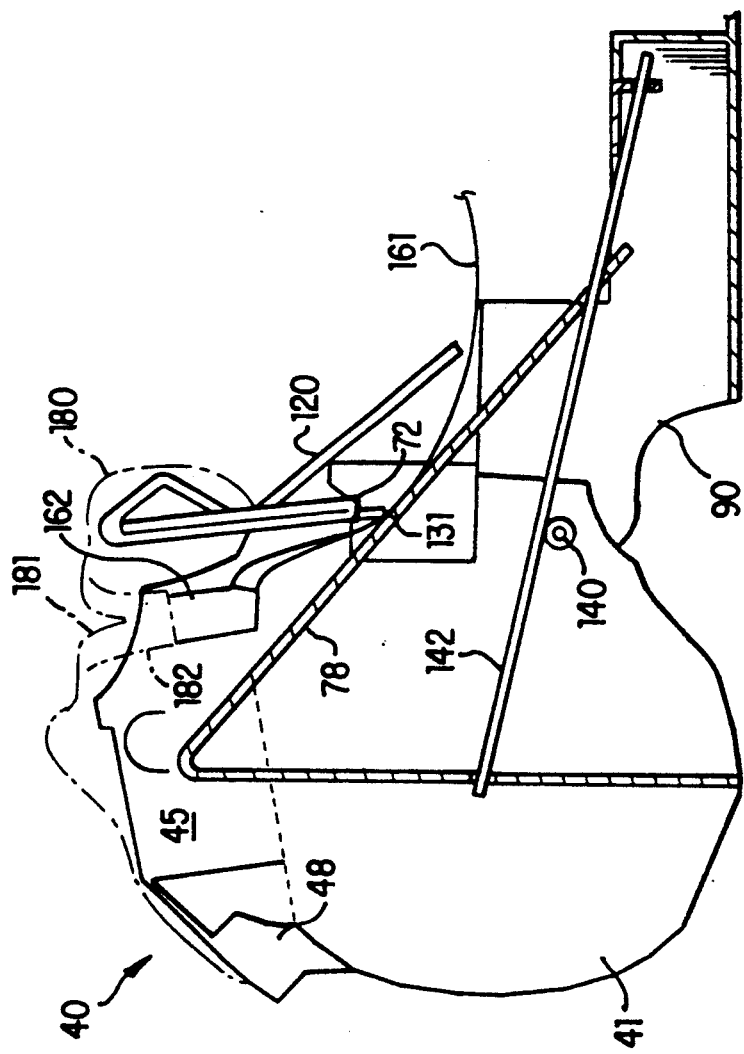
FIG. 17 is a view corresponding to that shown in FIG. 10 with an indicated face mask and inserted jaw simulation, showing the mode of operation of the jaw simulation in relation to the attitude of the head.

FIG. 17 shows the mode of operation of the jaw simulation 120 in conjunction with the strip portion 78 in controlling the supply of air through the trachea simulation 161. The skull portion 41 is completed by a face mask 180 comprising soft elastomeric material, to provide the head portion 40. The face mask 180 has a mouth opening 181 and a connection 182 which extend the latter inwardly. Face masks of this kind are known so that there is no need for a detailed representation thereof here. The face mask 180 covers the face panel 45 and substantially also the forehead panel 48 and is held by means of lateral strips (not shown) and openings provided therein on knobs or buttons (not shown) which are fitted into the holes 76 and 77 in the lateral fixing strips 74 and 75. This manner of fixing the mask is also generally known and does not need to be particularly described herein.

The jaw portion of the face mask 180 extends beyond the jaw simulation 120, under a certain stress, so that in that way the jaw simulation is urged into and fixed in the mounting openings 72. Thus, in this embodiment of the dummy according to the invention, the face mask 180 serves at the same time to fix the releasable jaw simulation so that no additional fixing elements are required. The inwardly extending connection 182 of the face mask 180 is sealingly fitted onto the holding edge 163 of the connecting portion 164 so that the valve 162 is held in position thereby. Thus, in accordance with the invention, the face mask 180 also serves to hold the releasable unit 160/161/162. The trachea simulation 161 extends from the valve 162 along the strip portion 78 behind the projection 131 of the chin simulation 120 and from there to the lungs bag 160 which is not shown in FIG. 17. In the pivotal position or attitude of the head simulation 40 relative to the neck portion 90, being the position in which the flexible spring bar 142 is substantially unstressed, as shown in FIG. 17, the projection 131 presses the trachea simulation 161 against the front side of the strip portion 78 and thereby squeezes it shut. In that position therefore air which is blown in through the mouth opening 181 cannot pass the clamped-shut position and flow into the lungs bag 162, or can do so only against a great degree of resistance. That achieves one of the functions referred to in the opening part of this specification, in a very simple manner, namely preventing artificial respiration when the head is in the wrong attitude. If on the other hand the head simulation 40 is pivoted rearwardly by pressing against the jaw simulation 120, as is to be done when actually performing artificial respiration on a human being, in which case the head simulation 40 pivots about the pivot axis 140 against the flexible resistance of the spring bar 142, the projection 131 then comes away from the strip portion 78 and thus releases the trachea simulation 161.

A mechanical sound generator in the form of a clicker device as shown in FIG. 18 is releasably fixed in a manner not shown in greater detail in the drawing, in the interior of the thorax, on the inside of the rear wall 2. The clicker device gives the person practicing the procedure a sound signal for monitoring the activity of that person, during the heart massage operation, at each heart compression. The clicker device is a very simple piece of equipment which can be pressed for example into an opening (not shown) in the rear wall 2. One such clicker device which is generally identified by reference numeral 190 essentially comprises a U-shaped loop portion 191 of a resilient plastic material, with a sound box 192 provided on one leg of the U-shaped legs. From the sound box 192, a projection 193 projects forwardly (upwardly in FIG. 18) with a tooth 194 and a pressing pin or plunger 195 is fixed to the other leg of the U-shape. It will be appreciated that the length of the pressing pin or plunger 195 is such that it is urged rearwardly by the front wall 1 upon correct heart compression being effected, and the clicker device 190 in that case experiences the deformation shown in FIG. 19b. As a result of that deformation, the free end of the leg of the U-shape which carries the pressing pin 195 hits against the sound box 192 and thereby produces a clicking noise. The possibility of further deformation, as shown at FIG. 19c, ensures that the clicker device is not damaged in the event of excessive heart compression. The clicker device described herein is only an example; there are series of simple mechanical sound generators which can be used here.

Figure 12:
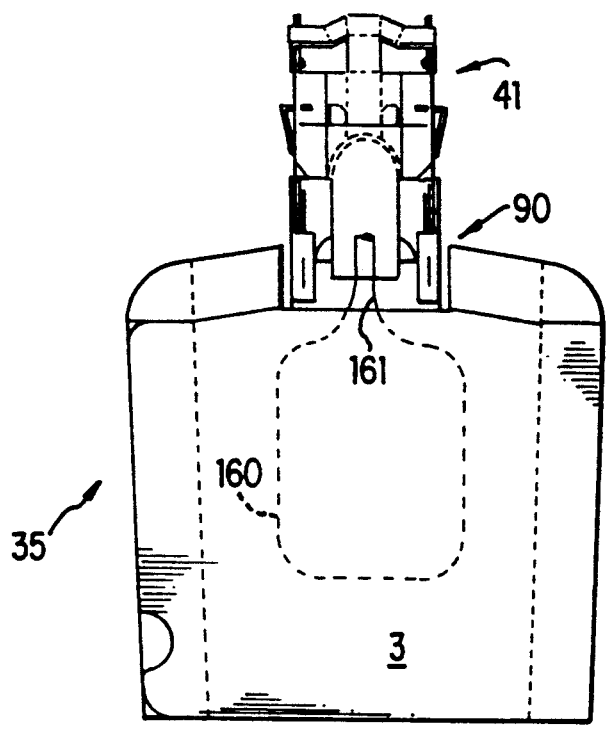
FIG. 12 is a front view of the thorax simulation/skull portion/neck portion combination in the joined condition.

In use of the dummy according to the invention the lungs bag 160 lies under the cover 3 on the front wall 1 of the thorax simulation (see FIG. 12). For fitting it in position, the insertion strip 20 is released from the insertion opening 28 so that the cover 3 can be pivoted up with a hinge-like movement about the fold line adjoining the lateral panel 7. After the lungs bag 160 has been applied in a flat condition, the cover 3 is closed again and fixed by means of the insertion strip 20. In the specified position the lungs bag 160 also covers the plate portion 27 in the front wall 1. If now artificial respiration is effected by blowing in air through the mouth opening 181, then, when the head simulation 40 is in the correct position, air passes through the trachea simulation 161 into the lungs bag 160 and expands the latter against the resistance with simultaneous elastic deformation of the cover 3 and the front wall 1 or the plate portion 27. As the plate portion 27 can be deflected comparatively easily into the interior of the thorax simulation, in comparison with the cover 3 and the remaining part of the front wall 1, because the plate portion is only fixed to the front wall 1 by means of the lower edge of the plate portion, at the beginning of the blowing-in phase expansion of the lungs bag 160 does not result in a visible lift of the cover 3, for a given short transitional time, but initially only causes the plate portion 27 to flex inwardly. That corresponds to the actual behavior of the human thorax when experiencing artificial respiration, the thorax visibly lifting only after a sufficient volume of air has been blown into the lungs. When further air is blown into the lungs bag 160 however expansion thereof also causes noticeable deformation of the cover 3, and that simulates the chest expansion which also occurs upon artificial respiration of a human being.

Thus, the dummy according to the invention performs a further one of the functions referred to in the opening part of this specification, in a very simple fashion from the point of view of structure, namely the realistic, visible but initially delayed lift of the chest when effecting artificial respiration. In addition, by virtue of the described configuration, the unit comprising the lungs bag 160, the trachea simulation 161 and the valve 162—possibly with the face mask 180—can be easily removed forwardly when the cover portion 3 is in an open condition, because that unit lies in the forwardly open neck portion and only extends through beneath the jaw simulation 120 which however lies only loosely in the mounting openings 72. The operation of fitting it into position is a correspondingly simple one.

The mask 180 has nostrils (not shown) which communicate with the connection 182. In that way the person practicing the procedure is obliged, in a fashion which is close to reality, to close the nostrils by clamping the nose between his or her fingers, as must also be done when actually performing artificial respiration. Thus, with the dummy according to the invention, the use of the per se known face mask 180 also requires that behavioral feature which is close to reality.

As already mentioned in the opening part of this specification, the material envisaged for the individual parts discussed of the dummy according to the invention are a web material, for example cardboard or corrugated cardboard which has a smooth lining on both sides. Corrugated cardboard is a particularly suitable material for the dummy according to the invention. More specifically, it can be comparatively easily plastically impressed and shaped so that it is possible for the top side of the cover 3 to be provided with a shaped relief configuration (not shown) which plastically simulates at least the human costal arch and the sternum but preferably also the ribs. In that way the trainee has the necessary indications for correct handling in the heart massage operation, which the trainee will also find on the human body in the same manner.

The cover portion 3 and the front side of the front wall 2 may possibly have informative representations giving the trainee more detailed instructions. Thus for example a realistic representation of the rib cage with a marking of the positions which are correct and essential for artificial respiration can be shown on the front wall 1.

If the unit consisting of the lungs bag 160, the trachea simulation 161 and the valve 162 is to be replaced, it is only necessary to open the cover portion 3 after release of the insertion strip 20, removal of the face mask 180 from the jaw simulation 120 and removal of the jaw simulation 120 from the mounting openings 172. The connection 182 of the face mask 180 is then freely accessible so that the holding edge 163 of the valve 162 can be pulled out of same.

By virtue of the dummy according to the invention being made in the above-described fashion from a web material which lies flat, it is possible for the functions which are individually described and which are essential for realistic CPR to be embodied without involving significant expenditure so that the dummy compiles with all essential requirements, in spite of an extremely low production cost. That applies even when only individual components of the dummy, for example only the head simulation 40 and the neck portion 90, are made from the above-mentioned material and in the above-mentioned material and in the above-described manner, whereas the thorax simulation is of the already known configuration.

The invention is not restricted to the above-described embodiment. Thus, instead of the spring device in the form of a bellows, it is also possible to use other springs, for example pneumatic cylinders or leaf springs. Instead of the described head simulation comprising the foldable web material, it may also be of conventional kind so that only the thorax comprises the foldable web material.

Insofar as the terms "top", "bottom", "front", etc. are used hereinbefore, they relate to the upright position of a human being.

What is claimed is:

1. A dummy for practicing cardiopulmonary resuscitation (CPR) of a human being comprising simulations of the thorax, the head and the lungs of a human being, wherein the thorax simulation comprises a resistance device to simulate the compression resistance of the thorax and a three-dimensional structure with a thorax cavity, wherein the three-dimensional structure is cut out of a flat foldable web material along predetermined contour lines, wherein the web material is folded along predetermined fold lines to provide the three-dimensional structure, and wherein the three-dimensional structure is formed by joining the web material to itself at a predetermined overlap region after the folding operation.

2. A dummy as set forth in claim 1 wherein the web material is cardboard.

3. A dummy as set forth in claim 1 wherein the resistance device comprises a compression spring which is disposed in the interior of the thorax cavity, which rests on the rear wall of the thorax simulation and which is held in the operative position by a holding means.

4. A dummy as set forth in claim 3 wherein the holding means is a first opening in the rear wall of the thorax cavity into which the compression spring is fitted in such a way that the compression spring is fixed against tilting forces.

5. A dummy as set forth in claim 4 wherein the simulation of the head has an extension which extends into the thorax cavity, has a second opening corresponding to the first opening in the rear wall of the thorax cavity, and is connected to the thorax simulation by the compression spring.

6. A dummy as set forth in claim 1 wherein the resistance device comprises a bellows of flexible elastic plastic material.

7. A dummy as set forth in claim 1 wherein the contour lines of the flat web material define a cover portion arranged over the three-dimensional structure in such a way that the front wall of the thorax simulation is double-walled with an intermediate space behind the cover portion.

8. A dummy as set forth in claim 7 wherein the cover portion is pivotable about a fold line or edge on the three-dimensional structure and can be releasably fixed at its opposite side from the fold line or edge.

9. A dummy as set forth in claim 8 wherein the cover portion can be fixed by means of an insertion strip which is integrally cut out from the opposite side, and a slit at the side of the thorax simulation.

10. A dummy as set forth in claim 8 wherein the front wall of the thorax simulation includes a plate portion which is integrally joined by its upper or lower edge to the front wall.

11. A dummy as set forth in claim 10 wherein at least one free edge of the plate portion is defined by slits in the front wall.

12. A dummy as set forth in claim 11 wherein the plate portion is joined by its lower edge to the front wall.

13. A dummy as set forth in claim 1 wherein the cross-section of the three-dimensional structure of the thorax simulation is of a flat-hexagonal configuration defined by two side surfaces, a front wall having side edges and a rear wall having side edges, wherein adjoining the side edges of the front wall and the rear wall are the side surfaces of equal width which meet at a respective lateral fold line, such that after removal of the resistance device from the thorax cavity, the three-dimensional structure can be readily compressed flat.

14. A dummy as set forth in claim 1 wherein the thorax cavity of the three-dimensional structure is shaped to accommodate the removable head simulation.

15. A dummy as set forth in claim 13 wherein shoulder portions are formed at the upper edge of a wall selected from the group consisting of the front wall and the rear wall, are foldable about fold lines and can be inserted into the thorax cavity.

16. A dummy as set forth in claim 1 wherein the head simulation comprises a skull portion and a mask with a mouth opening, which mask can be fixed on the skull portion and simulates the face, wherein the skull portion comprises a three-dimensional skull structure which is cut out of a flat foldable web material along predetermined skull contour lines, which is folded to provide the three-dimensional skull structure along predetermined fold lines.

17. A dummy as set forth in claim 16 wherein the web material is cardboard.

18. A dummy as set forth in claim 16 wherein the three-dimensional skull structure is stabilized by connection to at least one additional skull portion which is inserted into the cavity of the three-dimensional skull structure.

19. A dummy as set forth in claim 16 wherein the three-dimensional skull structure forms a face region and lateral skull surfaces of the skull portion and the additional skull portion is a plate which is inserted between the lateral skull surfaces.

20. A dummy as set forth in claim 18 wherein the additional skull portion is fixed by insertion strips in slits in the skull portion.

21. A dummy as set forth in claim 19 wherein the lateral skull surfaces laterally define a mouth opening of the face region and have mounting openings for a jaw simulation which can be inserted into same.

22. A dummy as set forth in claim 21 wherein the jaw simulation is cut out of a flat foldable web material along predetermined jaw contour lines.

23. A dummy as set forth in claim 22 wherein the web material is cardboard.

24. A dummy in particular as set forth in claim 16 wherein the head simulation is joined to the thorax simulation by means of a neck portion comprising a three-dimensional neck structure which is cut out of a flat foldable web material along predetermined neck contour lines, and is folded to form the three-dimensional neck structure along predetermined neck fold lines.

25. A dummy as set forth in claim 24 wherein the web material is cardboard.

26. A dummy set forth in claim 24 wherein the three-dimensional neck structure is joined to itself at a plurality of overlap regions.

27. A dummy as set forth in claim 24 wherein the neck portion is approximately U-shaped in cross-section, wherein the web portion of the U-shape forms the neck portion rear wall and wherein the legs of the U-shaped cross-section are pivotably connected in their upper end portions to the lateral skull surfaces of the head simulation about an axis which is parallel to the neck portion rear wall and perpendicular to the legs of the U-shaped cross-section.

28. A dummy as set forth in claim 27 wherein the axis is a bar which connects the leg portions of the U-shaped cross-section.

29. A dummy as set forth in claim 1, wherein the lungs simulation is a bag which communicates with the mouth opening of the head by way of a trachea simulation, wherein the head simulation is pivotable relative to the thorax simulation from a neutral position rearwardly into a respiration position and the trachea simulation is closed in the neutral position rearwardly into a respiration position and the trachea simulation is closed in the neutral position of the head simulation and is open in the respiration position, wherein provided in a first transverse wall of the thorax simulation or a head portion and in a second transverse wall of the head simulation are holding elements for holding a respective end of a spring element which holds the head simulation in a neutral position relative to the thorax simulation or the head position respectively.

30. A dummy as set forth in claim 29 wherein the spring element is a flexible spring bar which is clamped at the holding elements.

31. A dummy as set forth in claim 29 further comprising a jaw simulation having a rearwardly directed projection, wherein a support surface for a trachea simulation leading to the lungs simulation extends in the bottom of the mouth opening and behind the projection, and wherein said neutral position of the head simulation the projection presses the trachea simulation on to the support surface and clamps it shut.

32. A dummy as set forth in claim 31 wherein the support surface is formed by a downwardly folded strip of the plate portion forming the additional skull portion.

33. A dummy as set forth in claim 32 wherein the downwardly folded strip has a cut-out portion through which the spring element extends to hold the strip in a stressed condition.

34. A dummy as set forth in claim 16 wherein provided in the head simulation are laterally open mounting openings for the jaw simulation, wherein the jaw simulation is loosely fitted into the mounting openings and is readily removable after removal of the face mask.

35. A dummy as set forth in claim 27 wherein the web portion of the U-shaped cross-section of the neck portion is extended downwardly beyond the leg portions of the U-shape as a holding plate and includes an opening which corresponds to the opening in the rear wall of the thorax simulation and through which the compression spring passes, and wherein the holding plate is pressed against the rear wall by the compression spring.

36. A dummy as set forth in claim 1 wherein disposed in the thorax cavity is a mechanical sound generator which produces a sound signal at each compression of the thorax simulation that is of a predetermined depth.

* * * * *

UNITED STATES PATENT AND TRADEMARK OFFICE
CERTIFICATE OF CORRECTION

PATENT NO. : 5,256,070
DATED : October 26, 1993
INVENTOR(S) : Geoffrey C. Garth et al It is certified that error appears in the above-indentified patent and that said Letters Patent is hereby corrected as shown below:

| Column | Line | |
|--------|------|---|
| 12 | 49 | After "comprises" insert --(a)--. |
| 12 | 51 | After "and" insert --(b)--. |
| 14 | 3 | Change "claim 16" to --claim 18--. |
| 14 | 51 | Delete "rearwardly into a". |
| 14 | 52 | Delete entire line. |
| 14 | 53 | Delete "in the neutral position". |

Signed and Sealed this

Third Day of May, 1994

*Attest:*

BRUCE LEHMAN

*Attesting Officer*     *Commissioner of Patents and Trademarks*